(12) United States Patent
Violette et al.

(10) Patent No.: US 9,944,384 B2
(45) Date of Patent: Apr. 17, 2018

(54) METHOD AND A DEVICE FOR CONTROLLING AT LEAST TWO SUBSYSTEMS OF AN AIRCRAFT

(71) Applicant: AIRBUS HELICOPTERS, Marignane (FR)

(72) Inventors: Arnaud Violette, Vitrolles (FR); Jean-Pierre Baudry, Toulon (FR)

(73) Assignee: Airbus Helicopters, Marignane (FR)

( * ) Notice: Subject to any disclaimer, the term of this patent is extended or adjusted under 35 U.S.C. 154(b) by 2 days.

(21) Appl. No.: 14/936,910

(22) Filed: Nov. 10, 2015

(65) Prior Publication Data
US 2016/0137289 A1    May 19, 2016

(30) Foreign Application Priority Data
Nov. 14, 2014    (FR) ...................................... 14 02563

(51) Int. Cl.
| | |
|---|---|
| *B64C 19/00* | (2006.01) |
| *G01C 23/00* | (2006.01) |
| *G05B 23/02* | (2006.01) |
| *G05D 1/10* | (2006.01) |

(52) U.S. Cl.
CPC ............ *B64C 19/00* (2013.01); *G01C 23/005* (2013.01); *G05B 23/0216* (2013.01); *G05D 1/102* (2013.01)

(58) Field of Classification Search
CPC .. B64C 19/00; G01C 23/005; G05B 23/0216; G05D 1/102
See application file for complete search history.

(56) References Cited

U.S. PATENT DOCUMENTS

| | | | | |
|---|---|---|---|---|
| 6,697,718 | B2 * | 2/2004 | Le Draoullec | G05D 1/0055 244/194 |
| 7,103,434 | B2 * | 9/2006 | Chernyak | G06F 17/50 700/103 |
| 2002/0085041 | A1 * | 7/2002 | Ishikawa | G06T 15/10 715/804 |

(Continued)

FOREIGN PATENT DOCUMENTS

WO        2012161630        11/2012

OTHER PUBLICATIONS

French Search Report for French Application No. FR 1402563, Completed by the French Patent Office dated Aug. 5, 2015, 9 Pages.

*Primary Examiner* — John Olszewski
*Assistant Examiner* — Thomas E Worden
(74) *Attorney, Agent, or Firm* — Brooks Kushman P.C.

(57) ABSTRACT

A method of controlling subsystems of an aircraft. During a preparation step, at least one global order is stored in a database, each global order including an eligibility condition, and at least one global order including an activation condition, each global order specifying a command sequence comprising at least two actions to be implemented one after another or in parallel by two different members. During an initialization step, an onboard computer determines whether a global order is selected automatically or by a pilot. During an activation step, an onboard computer determines, where appropriate, whether the selected global order is feasible. During an implementation step, and providing the selected global order is feasible, the onboard computer performs the actions specified by the selected global order.

16 Claims, 3 Drawing Sheets

(56) References Cited

U.S. PATENT DOCUMENTS

| | | | |
|---|---|---|---|
| 2010/0161157 A1* | 6/2010 | Guilley | G05B 23/0272 701/3 |
| 2011/0160937 A1* | 6/2011 | Caillaud | G06Q 10/06 701/3 |
| 2013/0006689 A1* | 1/2013 | Kinnear | G06Q 10/06 705/7.16 |
| 2013/0345920 A1* | 12/2013 | Duggan | G05D 1/0061 701/23 |
| 2014/0200747 A1* | 7/2014 | Fezzazi | B64C 19/02 701/3 |

* cited by examiner

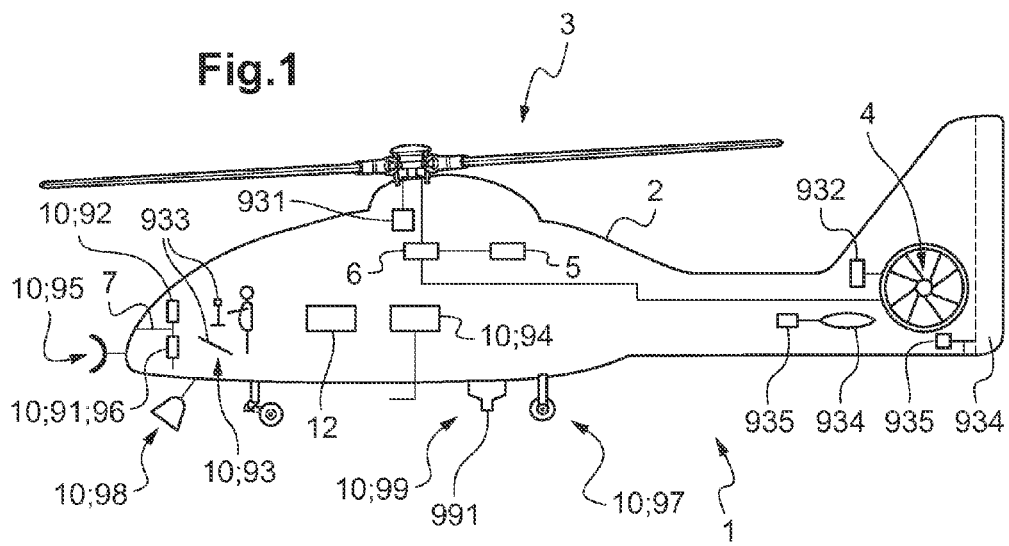
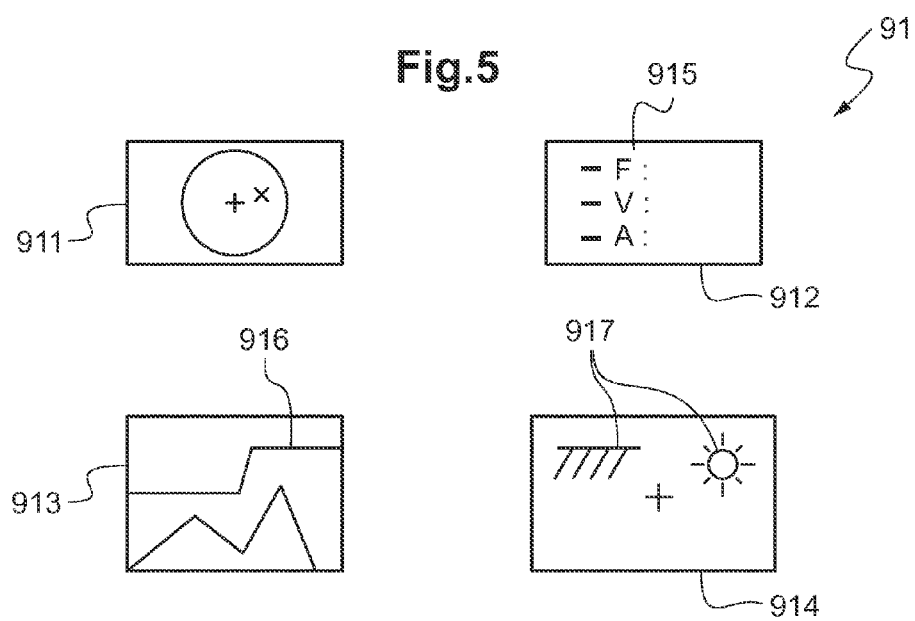

METHOD AND A DEVICE FOR CONTROLLING AT LEAST TWO SUBSYSTEMS OF AN AIRCRAFT

CROSS REFERENCE TO RELATED APPLICATION

This application claims priority to French patent application No. FR 14 02563 filed on Nov. 14, 2014, the disclosure of which is incorporated in its entirety by reference herein.

BACKGROUND OF THE INVENTION (1) Field of the Invention

The present invention relates to a method and a device for controlling at least two subsystems of an aircraft. The invention relates in particular to the technical field of pilot interfaces for an aircraft of the rotorcraft type.

(2) Description of Related Art

A rotorcraft may be functionally subdivided into a plurality of subsystems. For example, a rotorcraft has subsystems relating respectively to flight controls, landing gear, a search light, cameras, a radio navigation system, a navigation system, an autopilot system, information display systems, etc.

A subsystem may include man-machine interfaces referred to more simply below as "interfaces".

An "information interface" enables a pilot to receive information in visual, audible, or tactile manner.

A "control interface" enables a pilot to control members of the aircraft.

Furthermore, a subsystem may include an actuatable device capable of changing state on request, an actuator connected to an actuatable device in order to control the state of the actuatable device, or indeed measurement means for measuring at least one parameter.

An actuatable device thus represents a member of the aircraft that may be controlled on request, such as a search light, a winch, a camera, or indeed a movable airfoil surface, for example.

An actuator thus represents a member for operating such an actuatable device on receiving a command. An actuator may thus be in the form of a servo-control or of a switch, for example.

Furthermore, the aircraft may include a flight control subsystem.

The flight control subsystem includes actuatable devices that can be controlled in order to direct the aircraft. Such actuatable devices may comprise movable airfoil surfaces, wings, or blades of rotors, for example.

Furthermore, the flight control subsystem may include interfaces for controlling such control members. For example, a rotorcraft may include a cyclic control stick for controlling the cyclic pitch of the blades of a lift rotor by means of servo-controls, a collective pitch lever for controlling the collective pitch of the blades of a lift rotor by means of servo-controls, pedals for controlling a tail rotor for controlling yaw movement of the rotorcraft, and a throttle for controlling a power plant driving said rotors in rotation.

In addition, the aircraft may include a radio communication subsystem enabling a pilot to converse with third parties by using the interfaces of the subsystem.

The aircraft may also include a navigation subsystem for establishing a route to be followed, or indeed for displaying information relating to flight such as a heading being followed and the altitude of the aircraft, for example.

These interfaces are also used in an autopilot subsystem, e.g. for defining the mode of piloting to be applied.

Furthermore, display subsystems enable a pilot to monitor the operation of the aircraft. A subsystem of this type may comprise a fuel gauge, instruments for monitoring the power plant, or interfaces that display alarms in the event of a malfunction, for example.

This list of interfaces and subsystems is not exhaustive. Nevertheless, this list suffices to understand that a pilot may have a considerable workload while in flight.

In addition, modern aircraft can provide a pilot with the option of performing a wide range of missions. Some such missions are potentially complex and thereby increase the workload of a pilot. By way of illustration, a flight made through the middle of obstacles and/or with poor visibility is of a nature to complicate the work of the pilot.

Performing such missions may require multiple interfaces to be used, such as interfaces displaying obstacles that have been detected or that come from a database, or radars displaying weather conditions, for example.

Even though man-machine interface designers have made significant ergonomic progress, the overall workload on the pilot tends to increase on modern aircraft because of the increasing number of systems to be managed from the cockpit.

In the extreme, as from an excessive workload threshold, this workload can become dangerous because of the large number of actions that need to be performed.

In addition, a flight manual may specify that given actions should be implemented in a given sequence during particular stages of flight. A pilot must then commit those procedures to memory in order to carry them out in compliance with the predetermined sequence.

In particular, when the crew is faced with an unforeseen event, such as a failure, the crew must often respond quickly. The crew must therefore remember numerous procedures in order to be capable of reacting quickly.

Furthermore, such training can be difficult when the same crew flies several different aircraft having different procedures that all need to be remembered.

Furthermore, in the event of a failure, the aircraft may be in a situation that is stressful for the pilot. By way of example, a fuel leak can lead to considerable stress for the pilot. The pilot must then apply a predetermined procedure under a time constraint that is pressing. Under such circumstances, the pilot's workload can very quickly reach a level that is excessive and thus dangerous.

Furthermore, the interfaces of an aircraft are usually configured manually by the crew in a sequence of actions that the pilot is supposed to know. For example, when a search mission has terminated, the pilot reconfigures the interfaces so as to make available all of the information the pilot needs to return to a predefined base under the best possible conditions. Thus, the pilot requests various screens of the instrument panel to display in particular the route to be followed and associated weather information, together with information coming from a search radar. The pilot might possibly activate an autopilot system so that the aircraft follows a programmed route automatically.

If the pilot makes mistakes while performing these steps, those mistakes can become problematic. For example, the pilot ought to verify the pertinence of the route to be followed in the light of the quantity of fuel that remains in the tank of the aircraft. If the quantity of fuel is wrongly estimated, the aircraft might not be able to reach the intended destination.

Consequently, the workload on a pilot in flight is so great that performing certain complex missions requires the presence of an assistant (a pilot or some other person). Furthermore, the various crew members must coordinate their actions, and such coordination itself naturally implies additional workload.

Consequently, an aircraft has a plurality of man-machine interfaces made available to at least one pilot in order to perform missions of greater or lesser complexity. Nevertheless, using such man-machine interfaces can turn out to be difficult.

Document US 2013/0345920 describes an autonomous control system for a pilotless aircraft. That document is therefore remote from the field of the invention.

Likewise, Document WO 2012/161630 relates to a pilotless aircraft.

Document US 2011/160937 describes a centralized management method.

That method includes a step of creating tasks, a step of ordering tasks, and a step of executing tasks.

Document US 2010/161157 relates to a task management device.

Document US 2014/200747 describes a device for automatic management of configuration and reconfiguration of a plurality of systems of an aircraft.

BRIEF SUMMARY OF THE INVENTION

The present invention thus seeks to propose a method and a device seeking to reduce the workload of a pilot during certain stages of flight.

The invention relates in particular to a method of controlling subsystems of an aircraft, each subsystem having at least one member for selecting from a list comprising at least: an actuatable device that can change state on request; an actuator connected to at least one actuatable device for controlling the state of the actuatable device; a sensor measuring at least one parameter; an information interface providing at least one item of information to a person; and a control interface enabling at least one other member to be controlled.

Consequently, during this method the following steps are performed:

during a preparation step performed on the ground or in flight prior to a command sequence, storing at least one global order in a database, each global order including an eligibility condition specifying at least one condition to be satisfied in order to be able to select said global order, at least one global order including at least one activation condition, each global order specifying a command sequence including at least two actions to be implemented either in sequence or in parallel by two different members;

during an initialization step of initializing a command sequence, an onboard computer determines whether a stored global order, referred to as the "selected global order", has been selected automatically or by a "pilot action" performed by a person;

if said selected global order includes at least one activation condition, then during an activation step of activating the command sequence, an onboard computer determines the feasibility of said selected global order by verifying that the aircraft can implement said selected global order by determining whether each activation condition of said selected global order is satisfied; and during an implementation step of implementing the command sequence, if said selected global order does not have any activation condition or if each activation condition of said selected global order is satisfied, said onboard computer implements said actions specified by said selected global order.

In a variant, each global order includes at least one activation condition.

For example, the aircraft may include at least one of the following subsystems: an information subsystem for displaying information on an instrument panel and/or a head-up display system; a flight control subsystem; an autopilot subsystem; a navigation subsystem; a radio communications subsystem; a landing gear subsystem; a search light subsystem; and an observation subsystem having at least one camera.

In the context of this invention, so-called "global orders" are defined. Each global order is a contextual order, namely an order dedicated to performing a function of the aircraft as a function of the context. Consequently, a global order of the invention does not necessarily relate to a single subsystem, but could have effects on subsystems of different kinds, such as avionics, mechanical, or man-system interface subsystems, for example.

During the preparation step, a list of global orders is drawn up.

This list may be drawn up by the manufacturer and/or by a user.

Thereafter, and by way of example, a pilot may define at least one global order while on the ground or indeed while in flight. The pilot thus manipulates a control interface in order to store the global order, where such a control interface may comprise a keyboard, for example.

Each global order includes at least one eligibility condition indicating the condition in which the global order can be selected by a user or indeed by an onboard computer.

Furthermore, a global order includes a list of actions to be carried out sequentially or in parallel. The actions specified in a given global order may apply to multiple members of an aircraft, and not necessarily to members of a single subsystem. The actions specified by a given global order comprise technical actions leading either to a member being moved, or else to a physical transformation of a member by displaying an image containing information, by issuing a sound, or indeed by modifying the shape of an actuator, for example.

Consequently, each action may act on a man-system interface, an actuator, or an actuatable device in one or more subsystems.

An action may also define when the global order is to come to an end.

At least one global order may include at least one activation condition specifying criteria that need to be satisfied in order to be able to implement the programmed actions.

Global orders are stored in a database on board the aircraft.

In addition, when storing a global order, an onboard computer may verify the feasibility of the order before storing it. For example, a global order requesting a flight over a distance greater than the range of the aircraft may be refused.

During an initialization step, a stored global order is selected either automatically by an onboard computer or else by a "pilot" action. The term "pilot" is used broadly to mean any crew member. The term "pilot" action means a manual intervention (on a button, a touch screen, a pointer device, . . . ) or an oral intervention (voice command, . . . ) or a visual interaction (pointer, an oculometer, . . . ) for example, with this pilot action being undertaken using a control interface.

Under such circumstances, the onboard computer monitors a control interface in order to determine whether a global order has been selected, or else it itself selects a global order, where appropriate.

When a global order is selected, the global order becomes a selected global order for processing.

If a selected global order does not have any activation condition, then the selected global order can be activated without verification. Such a selected global order is considered as being always feasible and it can be referred to as an "activated" global order.

In contrast, if the selected global order has at least one activation condition, the onboard computer verifies that each activation condition is satisfied. If so, then the selected global order is feasible.

The onboard computer then verifies whether the aircraft can implement the selected global order as a function of its capacities (e.g. estimated fuel requirement greater than the quantity of fuel available in the tank, including safety margins), as a function of the weather, as a function of the topology of the terrain to be overflown, with this being done by means of the activation conditions of the selected global order.

The activation conditions may thus include, by way of example, comparing the quantity of fuel that is available with the quantity of fuel needed to perform the global order, comparing current weather conditions with predetermined weather conditions, or verifying lack of interference between a path being followed and terrain.

This verification may require communication between the onboard computer and numerous members of the aircraft in order to obtain data and to verify whether the global order is feasible. This data may include flight parameters, a path, weather data, . . . .

By way of example, a global order may seek to follow a path situated at a given altitude. The global order may include an activation condition that consists in verifying that said given altitude is higher than the altitude of the terrain being overflown. Consequently, if a mountain rises to an altitude higher than the given altitude and if it lies on the programmed path, then the onboard computer concludes that the global order cannot be activated.

If the activation step concludes that a selected global order having at least one activation condition is feasible, then the selected global order is said to be an "activated" global order.

A feasible global order is thus a selected global order that can be implemented without putting the aircraft and its occupants into danger. A global order is thus activated when the global order is selected either automatically or by a pilot, and when, where appropriate, all of its activation conditions are satisfied so as to enable the global order to be run.

When the selected global order cannot be activated because of its activation conditions, the onboard computer informs the crew by means of an information interface in order to explain non-activation of the selected global order. Nevertheless, the global order remains selectable for subsequent activation, providing its activation conditions are satisfied subsequently.

When the selected global order is activated, either automatically in the absence of any activation condition or as a result of verifying that each activation condition is satisfied, the onboard computer implements the actions specified in the sequence stored in the database.

As an illustrative example, a global order may be configured during a preparation step for the purpose of configuring the return of the aircraft to a base. This global order is referred to for convenience as a "return" order.

A pilot specifies that the return order may be selected at any time via an eligibility condition. Furthermore, the pilot specifies the activation conditions and the coordinates of the base. The activation conditions may include preparing a route to be followed and verifying that the route for following is compatible with the quantity of fuel stored in the tank, with weather conditions, and with the topology of the terrain to be overflown, for example.

In order to return to base, the pilot selects the return order via the man-machine system interface (voice command, touch screen, . . . ) from among a list of global orders that are potentially displayed on an information interface of the touch screen, helmet, . . . type.

The onboard computer then evaluates the feasibility of the operation in communication with the navigation subsystem. During the activation step, the navigation subsystem attempts to prepare a path that can genuinely be followed by the aircraft, while taking the context into consideration, namely the state of the aircraft and of the weather and of the terrain.

If the activation conditions are satisfied, the onboard computer displays the route as previously determined while taking account of an estimated level of fuel in the fuel tank, of weather conditions, of terrain relief, of the current capabilities of the aircraft, etc. . . .

Furthermore, the onboard computer may operate an autopilot subsystem so that the aircraft follows this path for returning to its base in complete safety.

At any time, the pilot can nevertheless take control, e.g. in order to modify the return path, with the return path either being proposed by a navigation subsystem on board the aircraft or being drawn up by a third party outside the aircraft and sent over a data link.

Thereafter, the method enables a global order to be defined that leads to multiple actions being implemented automatically, at least in part. Under such circumstances, the method serves to reduce the workload of a pilot significantly, whether before or during a flight.

Introducing global orders can thus make obsolete the requirement to remember procedures exhaustively.

In addition, the aircraft might be in a situation that is stressful for the pilot. This method serves to assist the pilot by implementing automatically a series of actions in a predetermined sequence.

In another aspect, the method makes it possible to implement procedures that cannot be implemented by a single person. Consequently, missions that, in the prior art, have required a crew made up of several people, can now be performed by a single person in application of the method.

The method can thus tend to increase the safety of the aircraft in certain situations. Specifically, the actions that are implemented during the implementation step are exhaustive, which is not always true when a pilot needs to implement multiple actions under stressful conditions. The performance of a global order of the invention thus tends to avoid incidents that have previously been provoked by errors in remembering procedures and implementing them manually.

Pilot training can also be made easier. The pilot is no longer required to remember an exhaustive list of controls to be implemented in a predetermined order for multiple procedures.

Likewise, it is easier to change from one aircraft to another. From the point of view of the crew, a global order can be identical from one aircraft to another, with the actions implemented by the global order in order to perform the desired function being transparent for the pilot. Nevertheless, from a systems point of view, it is possible for the sequence of actions to differ in part or in full.

In summary, a global order makes it possible automatically to implement a pre-established sequence of actions, which sometimes cannot be achieved by a single person.

Furthermore, the global order may be initiated automatically, being configured as a function of the current context of the aircraft, and possibly being verified during an activation step.

As explained below, the method can make it possible to verify that procedures are taking place properly. In the event of an anomaly during a procedure, the crew can be warned. The method can also assist the crew in decision making.

The method may also include one or more of the following characteristics.

For example, at least one global order specifies an eligibility condition indicating that the global order is selectable at any time.

A global order may be selected without prior requirements. For example, a global order to return to base may be selected at any time.

In another aspect, during said initialization step:

an onboard computer displays on an information interface a list of global orders that can be selected at a given instant, referred to as "selectable global orders", each selectable global order being a global order for which each of the eligibility conditions is satisfied at said given instant; and said onboard computer monitors a control interface to determine said selected global order as the order which is selected from the list of selectable global orders by a pilot operating said control interface.

This characteristic relates to non-automatic selection of a global order.

The computer displays the list of selectable global orders on a screen, e.g. a touch screen.

A selectable global order is a global order that can be selected by the crew at a given instant. By definition, not all global orders are selectable at any time, since certain global orders need to comply with context conditions. For example, certain global orders can be selected only during certain stages of flight or on certain missions.

A global order that is stored but without its parameters being set may also be unsuitable for selection.

Consequently, a pilot may at any time select a selectable global order. Specifically, only selectable global orders are shown to the pilot via an information interface such as a screen, a helmet, or backlighted buttons, for example.

The pilot can then voluntarily select a global order by means of a control interface, such as a mechanical button, a voice command, a touch screen, a keyboard, or a mouse, in particular.

Nevertheless, a particular global order may also be selected automatically.

Under such circumstances, at least one "autonomous" global order includes an eligibility condition specifying that this global order can be selected automatically, and during the initialization step the onboard computer automatically selects an autonomous global order when the eligibility conditions of the autonomous global order are satisfied.

For example, a pilot stores a search global order for programming actions to be implemented in a precise mission area. Optionally, a pilot requests cameras to be operated in a search area in order to observe wildlife in a restricted geographical area, for example.

The onboard computer then monitors a locating system in order to determine whether the aircraft is entering the search area, and automatically selects the search global order, when appropriate.

In another aspect, during the implementation step, said onboard computer may implement each action by transmitting respective signals to the members of the aircraft.

The implementation of an action is thus requested automatically by the onboard computer.

Nevertheless, during the implementation step, the onboard computer may perform an action of displaying a description of the action on an information interface so that the pilot carries out the action using a control interface, said onboard computer monitoring said members in order to determine whether the action has been implemented in order to continue the command sequence.

The action is then implemented by a pilot on request from the onboard computer. The onboard computer thus informs the pilot when a precise action needs to be implemented.

Furthermore, during the activation step, if the selected global order is not feasible because of its activation conditions, the onboard computer operates an information interface in order to inform the pilot.

The computer can also terminate implementation of a global order. Nevertheless, during the activation step, if the selected global order is not feasible, the onboard computer may determine an alternative order that is feasible and operates an information interface in order to inform a pilot about said alternative order, said onboard computer monitoring a control interface in order to determine whether a pilot has selected to refuse the alternative order or to modify the alternative order or to perform the alternative order, said onboard computer continuing with the current command sequence on the basis of said alternative order in the event of it being confirmed by the pilot.

For example, a return global order may provide for a direct route to a base along a straight line path.

During the activation step, the onboard computer may consider that that path cannot be implemented because of the presence of obstacles or of bad weather conditions. The onboard computer informs the pilot via an interface.

Furthermore, the onboard computer may attempt to prepare an alternative path that can be performed going round an obstacle, if any. For this purpose, the onboard computer communicates with a navigation subsystem by exchanging signals. Where appropriate, the alternative path is proposed to a pilot. The pilot can thus confirm and/or modify or reject the alternative order as prepared in this way.

Furthermore, a pilot may stop a global order at any time.

Thus, said onboard computer monitors a control interface in order to determine whether a pilot is seeking to stop a command sequence, and if so, it ends the command sequence. A pilot may be capable of operating a control interface in order to stop a command sequence at any moment.

In addition, during a monitoring stage, an onboard computer communicates with a monitoring interface to determine whether a failure is preventing an action being implemented, and if a said failure is detected:

the onboard computer operates an information interface to inform a pilot of the presence of such a failure;

the onboard computer monitors at least one control interface to determine whether a pilot is implementing said action or has selected to stop the command sequence; and if the pilot implements said action, the onboard computer continues with said command sequence.

The term "failure" is used to cover any event or state that might prevent an action being implemented correctly and in sequence.

For example, a failure is detected if landing gear remains jammed while running a global order for automatically extending the landing gear. Under such circumstances, the onboard computer gives the crew the option either of implementing the action manually, or else of terminating the global order.

Under such circumstances, the method may make a suggestion to the crew that it returns (or does not return) automatically to the initial state prior to implementing the global order.

Furthermore, the aircraft is to be found in an initial state prior to the implementation step, and in the event of a global order being interrupted, a person is given the option of restoring the aircraft to said initial state.

Furthermore, a stored global order may include settable parameters. During the preparation step, control interfaces are operated by a pilot in order to set said parameters.

Such a global order may optionally not be selected until said parameters have been set.

Furthermore, a stored global order may include at least one action to be selected from a list comprising an action for optimizing a mission parameter, an action for reconfiguring, at least in part, an information interface of a cockpit, and an action for controlling an actuatable device.

A global order may also tend to optimize a mission, e.g. by reducing the noise given off by an aircraft.

Nevertheless, a global order may alternatively or additionally act automatically to reconfigure at least one interface, at least in part.

For example, a global order may serve to display specific symbology formats on screens, a helmet, or any other type of display available in a cockpit.

The arrangement and the display of such information are preprogrammed by an operator as a function of various global orders.

Finally, a global order may request automatic and coordinated control of a plurality of elements of the vehicle and of the avionics, so that a rotorcraft is prepared for performing a stage of flight required by a particular mission, for example.

Thus, the database may include a global order for reaching a location, the global order including at least one of the following actions:

an action transmitted to a navigation subsystem requesting it to calculate and display a path to be followed in order to reach said location, optionally while optimizing a mission parameter;

an action transmitted to the flight control subsystem requesting it to calculate a reference speed of rotation of a rotor;

an action transmitted to the flight control subsystem requesting it to calculate a reference position for an airfoil surface;

an action transmitted to an autopilot subsystem requesting it to apply at least one of said speed of rotation and position references by operating at least one of said actuators; and an action transmitted to an information interface in order to inform a pilot when the path being followed is not optimal.

Instructions may thus be issued by the onboard computer, e.g. to take an aircraft to a base while minimizing the noise it gives off. This noise may be reduced by adjusting the speed of rotation of an aircraft rotor or by positioning fins and stabilizers in appropriate manner, for example.

Furthermore, the operating modes of an autopilot subsystem may be put into action on an order from the onboard computer. For example, a mode of following a path on the surface may be engaged during a deck-landing global order.

These actions are optionally performed automatically during the step of implementing the associated global order.

The global order may also act on control interfaces of a pilot in order to limit their authority without preventing them being used by means of force return systems, of symbol display systems, or by emitting sounds. For example, instructions may be transmitted to an information interface in order to inform a pilot when a path being followed is not optimized, or to avoid the aircraft entering into a vortex domain, for example.

Furthermore, a global order may comprise actions that are transmitted to a plurality of information interfaces requesting them to display:

information from a radar operating in anticollision monitoring mode;

at least one parameter relating to monitoring the vehicle;

a path; and current weather conditions.

In another aspect, if a stored global order requires the use of parameters that vary during a flight, for example, then the onboard computer determines those parameters even if the global order has not yet been selected during said initialization step.

Furthermore, a global order may be updated in real time in readiness for implementation.

In addition to a method, the invention provides an aircraft having subsystems, each subsystem comprising at least one member for selecting from a list comprising at least: an actuatable device that can change state on request; an actuator connected to at least one actuatable device for controlling the state of the actuatable device; a sensor measuring at least one parameter; an man-machine status-returning interface providing at least one item of information to a person; and a man-machine control interface suitable for generating at least one order for another member.

The aircraft then comprises:

a database storing a global order list; and an onboard computer connected to said database and to said members, said onboard computer including a processor unit performing said method as described above.

The processor unit may include calculation means and a non-volatile memory, said calculation means executing instructions stored in said non-volatile memory in order to execute the method as described above.

BRIEF DESCRIPTION OF THE SEVERAL VIEWS OF THE DRAWINGS

The invention and its advantages appear in greater detail from the context of the following description of examples given by way of illustration and with reference to the accompanying figures, in which:

FIG. 1 is a diagram showing an aircraft of the invention;

FIG. 5 is a diagram showing the execution of a global order.

Figure 2:
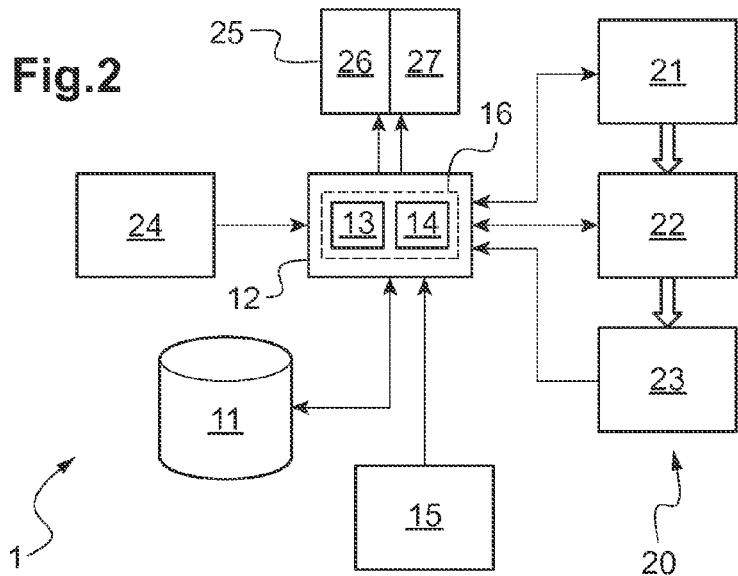
FIG. 2 is a diagram showing an onboard computer applying the method of the invention.

Elements present in more than one of the figures are given the same references in each of them.

DETAILED DESCRIPTION OF THE INVENTION

FIG. 1 is a diagrammatic view of an aircraft 1 of the invention.

The aircraft 1 comprises a fuselage 2 extending longitudinally from a nose to a rear end. Furthermore, the aircraft 1 may be a rotorcraft having at least one main rotor 3 carried by the fuselage 2.

In addition, the aircraft 1 may have a yaw movement control rotor 4 arranged at the tail of the rotorcraft. Such a rotor is more commonly referred to as a tail rotor, given its position at the rear end of the aircraft.

The rotors are driven in rotation by a power plant. For example, the power plant comprises at least one engine 5. The engine 5 is then connected to at least one rotor by a main power transmission gearbox 6.

Furthermore, the aircraft 1 has multiple subsystems 10 for enabling it to operate.

Among these subsystems 10, the aircraft includes in particular a flight control subsystem 93. This flight control subsystem 93 may include actuatable devices 931, 932 suitable for modifying the pitch of the blades of rotors, these actuatable devices 931, 932 comprising, for example, servo-controls connected to controls 933.

In addition, the aircraft may include actuatable devices 934 of the moving airfoil surface type, these airfoil surfaces possibly including a stabilizer and/or a tail fin, for example.

Under such circumstances, the flight control subsystem 93 is provided with actuators 935 controlling such actuatable devices 934.

The aircraft may also include an autopilot subsystem 94 connected to the flight control subsystem. By way of example, such an autopilot subsystem 94 may comprise a computer applying piloting relationships in order to control actuators connected to the flight control subsystem 93.

Furthermore, the aircraft may include an information subsystem 91 for displaying information on a control panel 7 and/or on a head-up display system 92.

By way of example, the information subsystem includes a panel for informing a pilot of failures.

The aircraft may also include a navigation subsystem 95 having the function of directing the aircraft, e.g. by providing the path that has been followed by the aircraft, a path to be followed by the aircraft, the altitude of the aircraft, . . . . Such a navigation subsystem 95 may comprise multiple pieces of equipment, and by way of example it may include a radar.

The aircraft also includes a radio communication subsystem 96, e.g. comprising a radio.

A landing gear subsystem 97 may also be carried by the fuselage.

Furthermore, a search light subsystem 98 may comprise at least one search light for illuminating a target, and an observation subsystem 99 having at least one camera 991 for taking motion or still pictures.

Subsystems may also include members in common. For example, a multifunction screen known as a multifunction "display" may serve to display information relating to a plurality of subsystems and may control members of a plurality of subsystems.

The aircraft 1 is also provided with an onboard computer 12 for performing the method of the invention.

With reference to FIG. 2, the onboard computer 12 has at least one processor unit 16.

The function of the processor unit is to perform the method of the invention. For this purpose, the processor unit may be of conventional type.

For example, the processor unit 16 may include calculation means 13 of the processor or microprocessor type. Under such circumstances, the processor unit 16 includes a non-volatile memory 14 storing information that can be executed by the calculation means 13. The processor unit may also include a volatile memory for storing temporary parameters values, for example.

The onboard computer is also connected to a database 11 in order to store information and/or to make use of use information stored in the database 11. The database may include at least one file. Likewise, the term "database" may refer to a single database, or else to a set of databases.

Furthermore, the onboard computer 12 is connected to a plurality of members 20 of a plurality of subsystems 10. The onboard computer can then generate output signals for controlling each member 20 that is connected to the onboard computer 12. Furthermore, the onboard computer receives input signals coming from certain members. These members may convey data of all kinds and instructions of all kinds.

In particular, the onboard computer is connected to at least one member 20 for making a selection in a list, the member 20 comprising at least one actuatable device 22 capable of changing state on request and an actuator 21 connected to at least one actuatable device 22 in order to control the state of the actuatable device. This list is referred for convenience as the "member" list.

Such actuators include in particular the actuators 933 of the flight control subsystem 93.

An actuatable device 22 may be a blade of a rotor or indeed a movable airfoil surface, it being possible for an actuator to be a servo-control giving rise to movement of an actuatable device. The actuatable device may also be a cock, a valve, a fuel meter, a windscreen wiper, landing gear, a search light, a camera, an extinguisher, a winch, etc. . . .

This list of members may also include sensors 23 for measuring at least one parameter. A sensor may be a sensor as such, or more generally it may be a measurement system. By way of example, a sensor 23 may be in the form of an air data system, an icing sensor, a temperature sensor, a range sensor, a speed or torque measurement system, a fuel gauge, a system for measuring electrical current or voltage, a system for determining the position of a moving portion, . . . .

Furthermore, the list of members may include information interfaces 25 providing information to at least one person. An information interface may include a device for issuing visible or audible signals, or indeed a haptic system.

The term "information interface" covers interfaces 26 displaying the status of members as well as interfaces 27 displaying a variety of information.

Finally, the list of members includes control interfaces 24 generating at least one order for some other member. Such a control interface may comprise a collective pitch lever, a cyclic stick, a button that can be operated manually, a voice control system, a mouse type pointer or the equivalent, a keyboard, . . . .

Furthermore, the onboard computer may be connected to a monitoring interface 15 for determining the presence of failures. Such a monitoring interface then represents an information interface dedicated to determining failures.

Reference may be made to the literature in order to obtain information about the various members described above.

This architecture enables the method of the invention to be performed.

Figure 3:
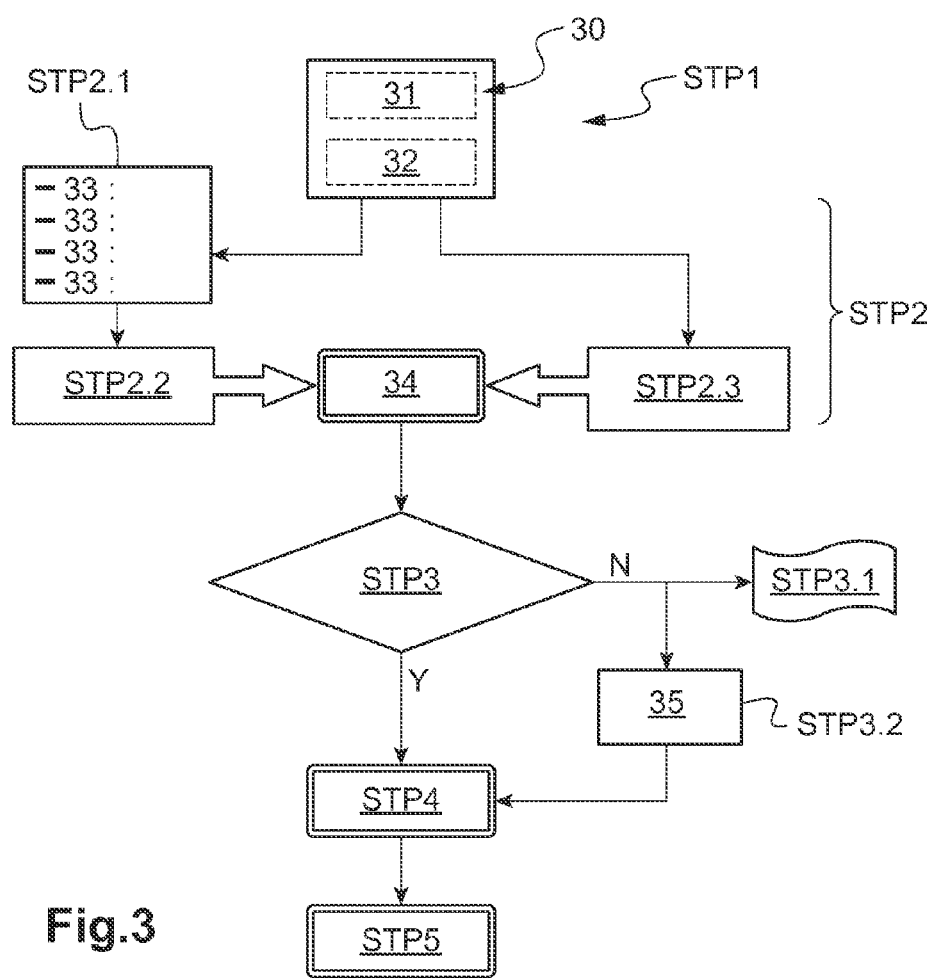
FIG. 3 is a diagram showing a preparation step and an initialization step of the invention.

With reference to FIG. 3, the method includes in particular a preparation step STP1.

During the preparation step STP1, at least one global order 30 is stored in the database 11.

This may be done by the manufacturer.

Nevertheless, a pilot may operate a control interface in order to program a global order on the ground or in flight, and cause it to be stored in the database.

A global order may optionally be preprogrammed in part. Consequently, such a global order includes parameters that need to be programmed by the pilot on the ground or in flight.

For example, a global order may relate to performing a landing procedure. Nevertheless, it is quite possible that the landing area and the route to be followed have not been programmed. A pilot must then cause the landing area to be stored before being able to use such a global order.

Each global order includes at least one eligibility condition that is stored in the database. This eligibility condition has the function of indicating when the global order can be selected.

By way of example, an eligibility condition specifies that the global order may be selected only during a stage of cruising flight.

Another type of eligibility condition specifies that the global order can be selected at any time.

Consequently, an eligibility condition may indicate whether a global order can be selected at any time, and by default when the global order can be selected.

In addition, an eligibility condition may indicate whether a global order is an order referred to as an order 31 "for selecting". Such an order for selecting needs to be selected by an action of the pilot in order to be performed.

In alternative manner, an eligibility condition may indicate whether a global order is an order referred to for convenience as an "autonomous global order 32". Such an autonomous global order indicates whether the global order can be selected automatically by the onboard computer when all of its eligibility conditions are satisfied.

Furthermore, at least one global order includes at least one activation condition stored in the database. This activation condition serves to indicate when the global order can be activated. A global order that does not have an activation condition can thus be activated without prior verification.

A global order may be impossible to implement depending on contextual conditions at a given instant. Such a contextual condition may include for example the current stage of flight of the aircraft. An activation condition can thus indicate that a global order cannot be activated during a takeoff stage. By way of example, winching a person may be prohibited during takeoff.

A contextual condition may also relate to the state of the aircraft. For example, a global order may be prohibited when a two-engined rotorcraft has one engine that has failed. In another example, a global order may be impossible to perform because of the quantity of fuel that is available.

Furthermore, a contextual condition may relate to weather conditions.

Finally, a contextual condition may take the state of the pilot into consideration.

In addition, a global order comprises a sequence of commands stored in the database. The global order may comprise at least two actions 50 to be implemented one after the other by two different members.

An action represents at least one command to be transmitted by the onboard computer to a member.

At least one action may be selected from a list referred to for convenience as an "action list", which may possibly be stored in the database.

Such a list of actions includes an action optimizing a mission parameter. For example, such an action seeks to determine a path that minimizes the noise given off by the aircraft.

A list of actions may include an action for reconfiguring at least in part an information interface in a cockpit. A global order may require particular data to be displayed on at least one display system.

This action list may also include an action for controlling an actuatable device, by means of a control signal transmitted to an actuator, when appropriate.

For example, a global order that enables a particular location to be reached may apply at least one of the following actions:

an action transmitted to a navigation subsystem requesting it to calculate a path to be followed in order to reach said location while optimizing a mission parameter, and for it to display the path;

an action transmitted to a flight control subsystem 93 requesting it to calculate a reference speed of rotation for a rotor and/or a reference position for an airfoil surface;

an action transmitted to an autopilot subsystem 94 in order to apply at least one of said reference speed of rotation and said reference position by operating at least one of said actuators 21; and an action transmitted to an information interface 25 in order to inform a pilot that a path being followed is not optimized.

FIG. 5 shows a global order comprising actions that are transmitted to a plurality of information interfaces. The onboard computer transmits signals to these interfaces in order to cause them to display:

information from a radar 911 in an anticollision monitoring mode on a first screen;

at least one parameter 915 relating to monitoring the vehicle on a second screen 912;

a path to be followed 916 on a third screen 913; and current weather conditions in the form of symbols 917 displayed on a fourth screen 914.

With reference to FIG. 3, a command sequence may be implemented on the ground or in flight.

Under such circumstances, during an initialization step STP2 that is performed by the onboard computer, it is determined whether a global order is to be selected automatically or by an action of a pilot. On being selected, such a global order is said for convenience to be the "selected global order 34".

Manual selection of a global order includes a display stage STP2.1. During this display stage STP2.1, global orders suitable for selection are displayed on an information interface. Thus, the onboard computer displays global orders that can be selected on an information interface.

For this purpose, the onboard computer analyses the eligibility conditions of stored global orders. Where appropriate, the onboard computer communicates with members of the aircraft in order to determine whether the eligibility conditions of each of the global orders are satisfied. If so, the global orders become global orders that are referred to as "selectable global orders 33".

A global order having parameters for setting may possibly remain unselected until said parameters have been set by a person.

During a manual selection stage STP2.2, a pilot can then perform a pilot action in order to select one of the selectable global orders. Thereafter, the onboard computer 12 monitors such a control interface 24 in order to determine which global order 34 has been selected, if any.

Automatic selection of a global order is performed during an automatic stage STP2.3.

If the eligibility conditions of an autonomous global order are satisfied, then the autonomous global order is selected automatically. In particular, the onboard computer selects this autonomous global order automatically.

When a global order having at least one activation condition is selected, an activation step STP3 is performed to determine whether the selected global order can be activated.

Consequently, the onboard computer acts, possibly by consulting at least one member of the aircraft, to determine whether the contextual activation conditions of the selected global order are all satisfied.

If not, the onboard computer may inform the pilot during an information stage SPT3.1. The onboard computer then transmits a signal to an information interface in order to indicate that activation cannot take place. The onboard computer can cause a message to be displayed specifying the reason why the selected global order is not being activated.

During a proposal stage STP3.2, if the selected global order 34 is not feasible, the onboard computer 12 determines an alternative order 35, where possible.

For example, a stored global order may specify actions that are to be performed if the activation conditions are not satisfied.

The onboard computer then operates an information interface 25 in order to inform a pilot about an alternative order 35. The onboard computer 12 then monitors a control interface 24 in order to determine whether a pilot has decided to refuse the alternative order 35, or to modify the alternative order 35, or indeed to perform the alternative order 35. The onboard computer 12 continues with the current command sequence on the basis of the alternative order, providing that alternative order is confirmed by the pilot.

If a global order is activated, the onboard computer then begins an implementation step STP4.

When a selected global order does not specify any activation condition, the selected global order is necessarily feasible and it can be confirmed automatically. Consequently, the activation step STP3 is not necessary. The onboard computer can then begin the implementation step STP4 after the initialization step STP2.

Nevertheless, the method may have provision for verifying that the selected global order does not specify any activation condition.

Under such circumstances, during this activation step, it is determined whether the selected global order does not specify any activation condition.

If it does not specify any activation condition, then the selected global order is activated and the implementation step STP4 is begun.

If it does specify an activation condition, it is then verified whether activation conditions are feasible, using the above-described procedure.

Consequently, when the selected global order, or where appropriate the alternative global order, is confirmed, the onboard computer begins an implementation step STP4. The actions specified by the global order in question are then performed.

For example, a return-to-base global order may be performed. This global order may provide activation conditions relating to the presence of obstacles or to suitable weather conditions, for example.

If the activation conditions for performing a return to base are not satisfied, the onboard computer informs the pilot. The onboard computer executes an alternative action, proposing an alternative route to be followed in order to reach a landing point safely. The crew can then confirm and/or modify or reject this route to be followed.

If the activation conditions are satisfied, then the onboard computer operates at least one information interface to propose a route for returning to base that takes account of the estimated level of fuel in the fuel tank, of weather conditions, of terrain in relief, and of the current capabilities of the aircraft. This proposed return path may optionally be modified or confirmed by the pilot performing a dedicated action.

Figure 4:
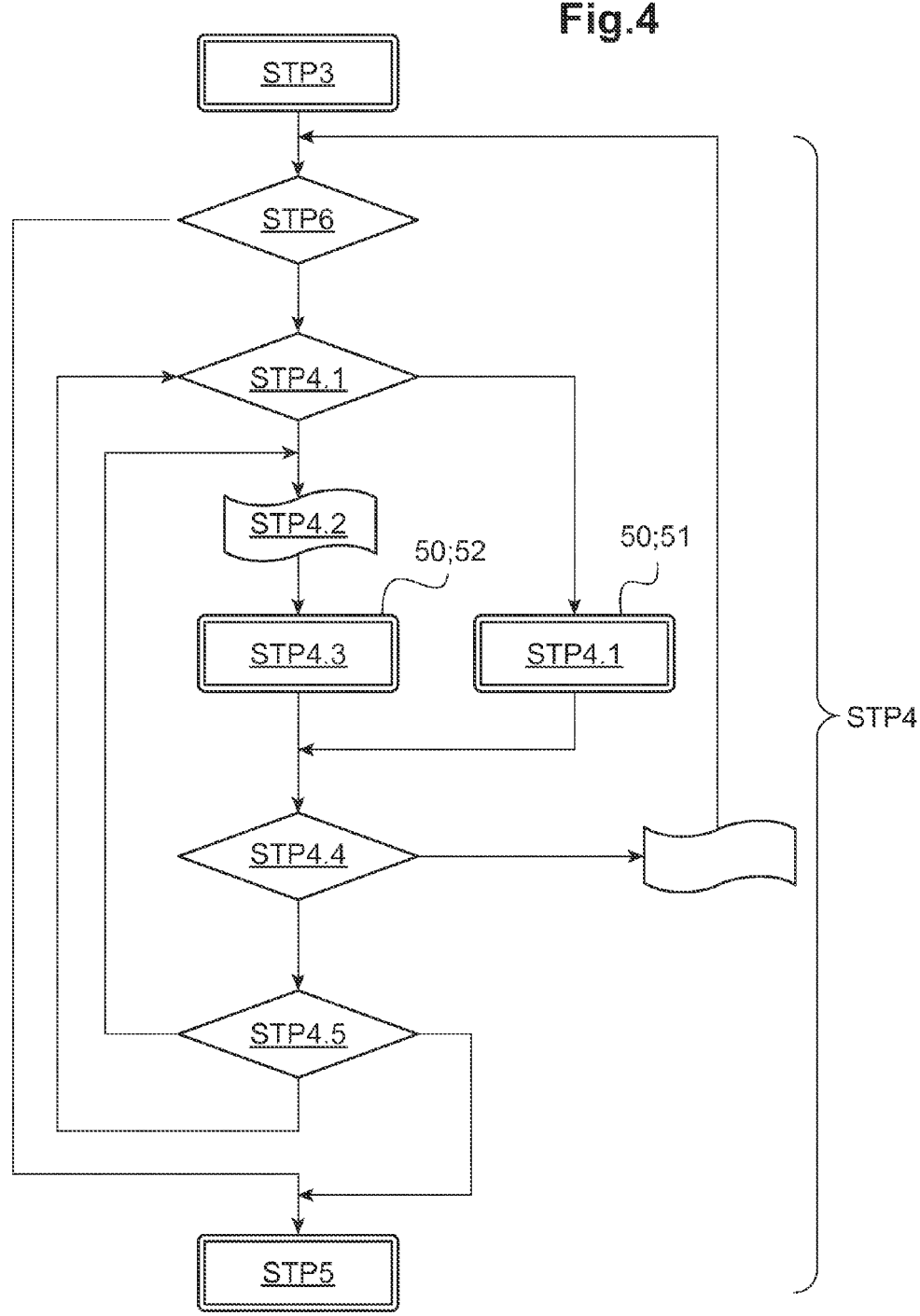
FIG. 4 is a diagram showing an implementation step.

With reference to FIG. 4, during the implementation step STP4, the onboard computer 12 performs the actions 50 specified by the selected global order 34, in the sequence as stored.

The stored actions may comprise two types of action: actions that can be implemented automatically, and actions that are implemented via a person performing an action.

An action that can be implemented automatically thus comprises instructions informing the onboard computer of commands to be transmitted to a member.

Under such circumstances, during a stage STP4.1, the onboard computer transmits at least one signal to at least one member in order to perform such an action 51.

For example, by executing a global order and in particular a return to base global order, the onboard computer operates interfaces in order to display the representation of the radar operating in anticollision monitoring mode, parameters relating to monitoring the vehicle, a safe route, and current weather conditions. Target modes of piloting may also be implemented automatically in the autopilot system so that the aircraft follows said route.

In contrast, an action that can be implemented only via a pilot action thus includes instructions telling the onboard computer to display the action that needs to be implemented on an information interface.

Under such circumstances, during a stage STP4.2, the onboard computer informs a pilot about the action 52 that is to be implemented. For example, the onboard computer may cause a message to be displayed on a screen.

During a stage STP4.3, the pilot then carries out said action 52. The pilot optionally informs the onboard computer by operating a member of the aircraft. Alternatively, the onboard computer monitors the operation of at least one member in order to determine whether said action is implemented.

When an action has terminated, the onboard computer processes the following action in the selected global order, until it reaches the end of the sequence STP5.

During an operating stage STP4.4, an onboard computer 12 optionally communicates with a monitoring interface 15 in order to determine whether a failure might prevent such an action being implemented.

When a failure is detected, the onboard computer 12 operates the information interface 25 in order to inform a pilot about the failure. Under such circumstances, the onboard computer 12 monitors at least one control interface 24 in order to determine whether a pilot is implementing the action in question or has decided to stop the command sequence. If the pilot is implementing the action, then the onboard computer 12 continues with the command sequence.

Furthermore, during a voluntary cancellation stage STP6, a pilot can act at any time to stop execution of a global order. This voluntary cancellation stage STP6 is shown diagrammatically at the top of FIG. 4, but it may occur at any time, in particular during the activation step. Consequently, the onboard computer 12 monitors a control interface 24 in order to determine whether a pilot is requesting that a command sequence be stopped.

Furthermore, a stored global order may include actions, eligibility conditions, or activation conditions that require the use of parameters that vary during a flight, such as the forward speed of the aircraft, for example.

Consequently, the onboard computer 12 may act continuously to determine values for such parameters, possibly by communicating with various members of the aircraft, even if the global order has not yet been performed during an implementation step.

By way of illustration, prior to the flight, a pilot may program a takeoff global order, a global order for cruising flight to a destination, and a landing global order.

By way of example, the takeoff global order is an order that includes settable parameters. These parameters may optionally include the nature of the takeoff area and the route to be followed after taking off.

Furthermore, the takeoff global order includes an eligibility condition. By way of example, this eligibility condition specifies a collective pitch to be reached by the blades of a rotor on the ground in order to enable the takeoff global order to be selected automatically.

The takeoff global order also specifies activation conditions. Thus, the takeoff global order may be activated in the absence of a critical failure providing the power that can be delivered by the engine is greater than a threshold, providing the wind lies within a range of winds specified by the manufacturer, and providing the center of gravity of the aircraft complies with manufacturer requirements, for example.

In addition, the takeoff global order specifies actions seeking to configure automatically multiple onboard displays (screens, helmet, . . . ) in order to enable the crew to monitor the automatic takeoff of the aircraft. By way of example, these actions may provide for displaying a path to be followed on a member known as a helmet-mounted symbology system (HMS/S), displaying a takeoff decision point (TDP) and when it is reached, . . . .

Furthermore, one action relates to retracting landing gear into a wheel well. Another action may comprise switching off a landing light.

The cruising global order may specify an eligibility condition indicating automatic selection as soon as at least one parameter reaches a threshold. For example, the cruising global order may be engaged as from a threshold forward speed and/or a threshold altitude of the aircraft.

The cruising global order may include an activation condition, such as the absence of any critical failure, for example.

Finally, the cruising global order may include actions for determining a path all the way to a destination. In addition, actions may seek to reconfigure displays so as to enable the crew to follow the active flight plan. By way of example, actions destined for an autopilot system serve to enable the aircraft to follow the path automatically, possibly while complying with lateral and vertical limits relative to the path that is to be followed.

The landing global order may specify an eligibility condition indicating that the order can be engaged at any moment once the destination has been set.

Under such circumstances, the pilot acts on the ground or in flight to store the destination, thus making the global order selectable.

The landing global order need not be associated with any activation condition.

Finally, the landing global order may include the following actions:

calculating and then displaying an optimum path (reference speed and vertical profile to be followed) all the way to the landing point;

calculating and tracking a reference speed of rotation for the main rotor;

calculating and optimally positioning a tail fin and/or stabilizer;

limiting, while not preventing, maneuvers that might the aircraft to enter vortex conditions, e.g. by means of haptic return in the flight control; and extending the landing gear.

Consequently, the pilot may act, e.g. on the ground, to set a takeoff global order of the type referred to as a "category A point takeoff". The onboard computer then causes the navigation system to calculate the position of a takeoff decision point (TDP) and a takeoff path. The global order then includes an action consisting in particular in following said path. The pilot verifies this data and stores the global order.

Once all the parameters have been set, the pilot operates the aircraft so that it taxis to the takeoff position. After receiving authorization to take off from the control tower, the pilot pulls a little on the collective pitch lever in order to take off. The takeoff global order is then automatically selected.

Thereafter, the onboard computer verifies that all of the activation criteria are satisfied in order to activate this takeoff global order.

If so, the onboard computer performs the actions specified in the takeoff global order by automatically configuring the various displays to enable the crew to monitor takeoff. The crew can thus at all times see where the takeoff decision point (TDP) is situated relative to the current maneuver. Furthermore, the landing gear is retraced and the landing light is extinguished where necessary in automatic manner and at the appropriate moment.

Once this takeoff global order has been completed, the cruising global order is engaged automatically, with the eligibility criteria for this cruising global order being satisfied. The computer the performs various actions of the cruising global order in order to reconfigure the various displays so as to enable the crew to follow the active flight plan. Furthermore, the piloting system controls the aircraft.

On approaching the destination, the pilot selects the landing global order. The onboard computer then performs the various specified actions.

In particular, the onboard computer operates an actuator to extend the landing gear, where appropriate.

If the landing gear remains jammed while performing the actions of the landing global order, the onboard computer indicates this fault to a pilot by operating an interface. The pilot then has the option of manually extending the landing gear or of interrupting the global order.

Naturally, the present invention may be subjected to numerous variations as to its performance. Although several implementations are described, it will readily be understood that it is not possible to identify exhaustively all possible implementations. It is naturally possible to envisage replacing any of the means described by equivalent means without going beyond the ambit of the present invention.

What is claimed is:

1. A method of controlling subsystems of an aircraft, the subsystems as a group having a plurality of members with each subsystem having at least one of the members, each member being either an actuatable device, an actuator, a sensor, an information interface for providing at least one item of information to one or more staff persons of the aircraft crew, or a control interface for controlling at least one of the other members, the members as a group including at least one actuatable device, at least one actuator, at least one sensor, at least one information interface, and at least one control interface, the method comprising:

during a preparation step performed on the ground or in flight, storing global orders in a database, each global order including at least one eligibility condition to be satisfied to be able to select the global order including an eligibility condition which specifies a stage of flight that the aircraft must have for the global order to be able to be selected, at least one of the global orders including at least one activation condition which specifies criteria regarding at least one of capacities of the aircraft, weather of an environment in which the aircraft is located, and a topology of a terrain to be overflown by the aircraft that must be satisfied for the aircraft to be able to implement the at least one of the global orders, and each global order corresponding to a respective process by specifying a command sequence including actions to be implemented in a predetermined sequence by at least two members of at least two of the subsystems;

during an initialization step, an onboard computer of the aircraft (i) displaying on one of the at least one information interface a list of the global orders that can be selected at a current instant, each of the global orders on the list referred to as a "selectable global order", each selectable global order being a global order for which each of the at least one eligibility condition of that global order is satisfied at the current instant, (ii) determining that one of the global orders has been selected, the one of the global orders selected being referred to as "the selected global order", and (iii) determining whether the selected global order was selected autonomously by the onboard computer or by the one or more staff persons of the aircraft crew;

during an activation step, when the selected global order is one of the global orders including at least one activation condition, determining by the onboard computer whether each activation condition of the selected global order is satisfied and verifying by the onboard computer that the aircraft can implement the selected global order when each activation condition of the selected global order is satisfied; and during an implementation step, implementing by the onboard computer, in the predetermined sequence of the selected global order, the actions of the command sequence of the selected global order when either the selected global order is not one of the global orders including at least one activation condition or the selected global order is one of the global orders including at least one activation condition and each activation condition of the selected global order is satisfied.

2. The method according to claim 1, wherein the at least one eligibility condition of at least one of the global orders is non-existent.

3. The method according to claim 1, wherein during the initialization step:

the onboard computer monitors one of the at least one control interface to determine the selected global order as the global order which is selected from the list of selectable global orders by the one or more staff persons of the aircraft crew operating the one of the at least one control interface.

4. The method according to claim 1, wherein the at least one eligibility condition of at least one of the global orders indicates that the at least one of the global orders can be selected autonomously by the onboard computer, each of the global orders which can be selected autonomously by the onboard computer being referred to as an "autonomous global order", and during the initialization step the onboard computer autonomously selects each autonomous global order when the at least one eligibility condition of the autonomous global order is satisfied.

5. The method according to claim 1, wherein during the implementation step, the onboard computer implements each action of the command sequence of the selected global order by transmitting respective signals to the at least two of the members of the at least two subsystems of the aircraft.

6. The method according to claim 1, wherein during the implementation step, the onboard computer displays a description of one of the actions of the command sequence of the selected global order on one of the at least one information interface for the one or more staff persons of the aircraft crew to carry out the one of the actions using one of the at least one control interface, and monitors the at least two of the members of the at least two subsystems to determine whether the one of the actions of the command sequence of the selected global order has been implemented to continue the command sequence of the selected global order.

7. The method according to claim 1, wherein during the activation step, the onboard computer determining whether or not the selected global order is feasible and, upon the onboard computer determining that the selected global order is not feasible, operating by the onboard computer one of the at least one information interface to inform the one or more staff persons of the aircraft crew that the selected global order is not feasible.

8. The method according to claim 1, wherein during the activation step, the onboard computer determining whether or not the selected global order is feasible and if the selected global order is determined to not be feasible, the onboard computer determines an alternative global order that is feasible, operates one of the at least one information interface to inform the one or more staff persons of the aircraft crew about the alternative order, monitors one of the at least one control interface to determine whether the one or more staff persons of the aircraft crew has selected (a) to refuse the alternative order, or (b) to modify the alternative order, or (c) to perform the alternative order, wherein the onboard computer performs a command sequence associated with the alternative order upon the alternative order being selected and confirmed by the one or more staff persons of the aircraft crew.

9. The method according to claim 1, wherein while the command sequence of the selected global order is being implemented the onboard computer monitors one of the at least one control interface to determine whether the one or more staff persons of the aircraft crew is seeking to stop the command sequence of the selected global order; and terminates the command sequence of the selected global order upon determining that the one or more staff persons of the aircraft crew is seeking to stop the command sequence of the selected global order, wherein the at least one control interface may be operated by the one or more staff persons of the aircraft crew to instantaneously stop the command sequence of the selected global order during the implementation step.

10. The method according to claim 1, wherein at least one of the global orders includes adjustable parameters, the method further comprising:

during the preparation step, operating by the one or more staff persons of the aircraft crew one of the at least one control interface to set the adjustable parameters of the at least one of the global orders including adjustable parameters.

11. The method according to claim 1, wherein one of the global orders is a first global order for reaching a location, the actions of the command sequence of the first global order including at least one of the following actions:

an action transmitted to a navigation subsystem of the aircraft requesting the navigation subsystem to calculate a path to be followed by the aircraft for the aircraft to reach the location and to display the path;

an action transmitted to a flight control subsystem of the aircraft requesting the flight control subsystem to calculate a reference speed of rotation of a rotor of the aircraft;

an action transmitted to the flight control subsystem requesting the flight control subsystem to calculate a reference position for an airfoil surface of the aircraft;

an action transmitted to an autopilot subsystem of the aircraft requesting the autopilot subsystem to apply the speed of rotation of the rotor of the aircraft by operating at least one of the at least one actuator; and an action transmitted to one of the at least one information interface of the aircraft to inform the one or more staff persons of the aircraft crew regarding a path being followed by the aircraft.

12. The method according to claim 1, wherein the actions of the command sequence of at least one of the global orders are actions requesting at least one of the at least one information interface to display:

information from a radar operating in an anti-collision monitoring mode;

at least one parameter relating to monitoring the aircraft;

a path of the aircraft; and current weather conditions.

13. The method according to claim 1, wherein one of the global orders requires the use of parameters that vary during a flight of the aircraft, the method further comprising:

determining by the onboard computer the parameters of the one of the global orders even when the one of the global orders has not yet been selected during the initialization step.

14. The method of claim 1, wherein the subsystems include at least two of the following subsystems: an information subsystem for displaying information on an instrument panel or a heads-up display system; a flight control subsystem; an autopilot subsystem; a navigation subsystem; a radio communications subsystem; a landing gear subsystem; a search light subsystem; and an observation subsystem having at least one camera.

15. An aircraft comprising:

a plurality of subsystems, the subsystems as a group having a plurality of members with each subsystem having at least one of the members, each member being either an actuatable device, an actuator, a sensor, an information interface for providing at least one item of information to one or more staff persons of the aircraft crew, or a control interface for controlling at least one of the other members, the members as a group including at least one actuatable device, at least one actuator, at least one sensor, at least one information interface, and at least one control interface;

a database storing a plurality of global orders, each global order including at least one eligibility condition to be satisfied to be able to select the global order including an eligibility condition which specifies a stage of flight that the aircraft must have for the global order to be able to be selected, at least one of the global orders including at least one activation condition which specifies criteria regarding at least one of capacities of the aircraft, weather of an environment in which the aircraft is located, and a topology of a terrain to be overflown by the aircraft that must be satisfied for the aircraft to be able to implement the at least one of the global orders, and each global order corresponding to a respective process by specifying a command sequence including actions to be implemented in a predetermined sequence by at least two of the members of at least two of the subsystems; and an onboard computer connected to the database and to the members, the onboard computer configured to display on one of the at least one information interface a list of the global orders that can be selected at current instant, each of the global orders on the list referred to as a "selectable global order", each selectable global order being a global order for which each of the at least one eligibility condition of that global order is satisfied at the current instant, determine that one of the global orders has been selected, the one of the global orders selected being referred to as "the selected global order", determine whether the selected global order was selected autonomously by the onboard computer or by the one or more persons of the aircraft crew, when the selected global order is one of the global orders including at least one activation condition, determine whether each activation condition of the selected global order is satisfied and verify that the aircraft can implement the selected global order when each activation condition of the selected global order is satisfied, and implement in the predetermined sequence of the selected global order the actions of the command sequence of the selected global order when either the selected global order is not one of the global orders including at least one activation condition or the selected global order is one of the global orders including at least one activation condition and each activation condition of the selected global order is satisfied.

16. The aircraft according to claim 15, wherein the subsystems include at least two of the following subsystems: an information subsystem for displaying information on an instrument panel or a heads-up display system; a flight control subsystem; an autopilot subsystem; a navigation subsystem; a radio communications subsystem; a landing gear subsystem; a search light subsystem; and an observation subsystem having at least one camera.

* * * * *